Patented Oct. 21, 1947

2,429,369

UNITED STATES PATENT OFFICE 2,429,369

PRODUCTION OF ADHESIVE CARRIER FILM AND UTILIZATION THEREOF

Philip Hamilton Rhodes, Portland, Maine, assignor, by mesne assignments, to Koppers Company, Inc., a corporation of Delaware No Drawing. Application December 3, 1942, Serial No. 467,791

17 Claims. (Cl. 154—133)

The present invention relates to the production of what is known in the art as "film glue," and the utilization thereof in the manufacture of bonded articles and particularly plywood, laminated wood, and the like. This type of film glue is well known in the art and is produced by impregnating a very thin carrier medium, such as thin tissue paper, with a solution of a heat reactive resin and drying the impregnated film at a temperature insufficient to effect any set of the resin impregnation. In accordance with the present invention, the film carrier, such as tissue paper, is impregnated with a solution comprising two-stage resin and a setting agent therefor, and the pH of this impregnating solution is maintained during the impregnating operation between 7 to 9, and more preferably between 7.3 and 8.

Not only does the maintenance of this pH range offer advantages in the production of the film glue, but the article itself offers a number of advantages when used as an adhesive bonding agent for the uniting of a plurality of members of organic or inorganic origin, and more especially when said members are wooden members such as are commonly used in the manufacture of plywood and laminated wood.

The production of a film of adhesive, when said adhesive or potential adhesive is a heat reactive dihydroxy benzene aldehyde condensation product, involves a problem which is not present in the production of a film adhesive or film glue in which the impregnating resin is a heat reactive monohydric benzene aldehyde condensation product such as a phenol formaldehyde condensation product. Solutions of heat reactive dihydroxy benzene aldehyde resins are characterized by the property of increasing in viscosity when allowed to stand for a period varying between 30 minutes and 48 hours. This increase in viscosity in such a short time sharply distinguishes solutions of the heat reactive dihydroxy benzene aldehyde resins from solutions of the monohydroxy benzene heat reactive aldehyde resins. It is desired to point out that the impregnating operation of the carrier base, such as thin tissue paper, is effected by passing the base or film through the resin solution to which, when a two-stage resin has been prepared, there has been added a setting agent.

In the solution of a dihydroxy benzene aldehyde resin, as, for example, a resin compounded from resorcin and formaldehyde in which the ratio of the formaldehyde to the resorcin is less than 1:1, if the pH thereof is lower than 7, the viscosity of the impregnating adhesive or potential adhesive increases so rapidly that at the end of an 8-hour period, the viscosity is so high that the liquid resin ceases to properly penetrate the carrier.

As the pH of the resin solution is raised, the keeping qualities of the resin solution in the tank are improved. However, with an increase of the pH above 7, there is a tendency for the dried finished coated impregnated film containing solid particles of resin to become tacky in humid air. In other words, as the humidity of the atmosphere increases, the film glue, when the pH departs from 7, exhibits an increasing tendency to stick to cutting machines, trimming tables, and similar mechanisms. Further, as the pH of the resin solution increases above 8, a hot set adhesive bond made from said solution is characterized by decreased water resistance on being boiled in water. In other words, the higher the pH above 8, the greater the water solubility of a dihydroxy benzene aldehyde two-step hot set bond when submerged in boiling water for several hours, for example, 3 to 6 hours, according to the accelerated aging test used in the testing of such bonds.

Considering the above, namely, that a pH between 7 and 7.3 is desirable from the standpoint of keeping properties, and that a pH of 8 or thereabouts is desirable from the point of water solubility, it is usually necessary to strike an average pH which preferably varies between 7 or 7.3 to 8, but which may give fairly satisfactory results when it varies from between 7 to 9. When the water solution of the resin is of dominating importance, the pH should not exceed 8, even though some tackiness of the film will be apparent. Under some conditions the pH may be adjusted to 7.5, giving good water resistance and not much tackiness. As the pH of the resin solution departs from 7 or 7.1 it does tend to become sticky and a little difficult to handle.

When a hot set bond is produced from a two-stage dihydroxy benzene aldehyde resin solution having a pH varying from 7 to 8 and preferably 7.3 to 8, the shear strength of the hot set bond is higher than if said bond had been made from a resin solution of the same character in which the pH was higher than 8. The hot set bonds referred to are those produced by hot pressing wooden members which are laid up with the resin film and then subjected to a temperature of 200° F. or over at pressures usually varying between 150 and 250 pounds per square inch.

The following is an example of the preparation of a resin solution adapted to impregnate the film carrier:

Example

The following materials are mixed together:

| | Grams |
|---|---|
| Resorcin | 2500 |
| 37% formaldehyde | 1250 |
| Water | 1500 |
| Oxalic acid | 15 |

The solid resorcin and 500 grams of formaldehyde are placed in a suitable reaction vessel which may be a steam jacketed kettle comprised of a cover, an addition inlet, a simple reflux condenser, and a variable speed agitator. The mixture of resorcin and formaldehyde is gradually warmed in the kettle until a homogeneous solution is produced. Preferably the mixture is heated for about 20 to 40 minutes until the mixture reaches a temperature of 100° C. Then, there is added as rapidly as possible 750 grams of formaldehyde. During the addition of this subsequent portion of formaldehyde, the mass is briskly agitated in order to prevent any local action resulting in the formation of insoluble particles of set-up resin. As soon as all of the formaldehyde has been added, a suitable catalyst which is preferably an acid catalyst, and more desirably oxalic acid, is introduced into the mass in order to complete the reaction. To insure the complete tie-up of the formaldehyde, it is desirable to reflux the contents for a suitable period of time after the addition of the oxalic acid. Usually about 5 minutes, using the quantities indicated, are sufficient. At this point, 1500 grams of water are added, with thorough stirring, and the reaction mass cooled to about 25° C. The step of cooling the mass is merely a preferred procedure, and the reaction may be carried forward without the cooling step. The so-produced resin solution is then treated with any alkaline agent in solution until the resin solution has a pH varying from 7 to 9 and preferably from 7.3 to 8. This pH may be obtained by adding to the resin solution a solution of sodium hydroxide made by dissolving 65 to 75 grams of sodium hydroxide in 150 grams of water. Instead of using sodium hydroxide, any water soluble alkaline material compatible with the resin may be used, including a solution of potassium hydroxide, potassium carbonate, sodium carbonate, ammonium hydroxide, ammonium carbonate, lithium hydroxide, lithium carbonate, and the like.

The resulting resin solution is thereafter removed from the kettle and may be stored for six weeks, six months, or even a year, without any substantial deterioration in the properties of the resin solution. This offers the advantage that the resin solution which is to be used for the hot pressing of wooden materials including plywood and laminated wood may be shipped in the solution form to the consumer and he may keep it in that form until he is ready to utilize it as an impregnating agent in the production of a film glue.

The resin solution produced as above set forth is introduced into the tank of a treating machine and the resin solution is then made heat reactive by adding thereto a solution of a methylene-containing hardening agent such as hexamethylene tetramine, which may preferably be made by dissolving 270 grams of hexa crystals and 500 grams of water for the amount of resin solution above set forth, which is in the neighborhood of 5500 grams. The film tissue paper is passed through the treating tank, then through a mechanism for removing the excess resin solution, and thereafter dried at a relatively low temperature which is insufficient to set up the resin solution. The resulting film contains about 70% of resin solids and may be formed into a roll and stored until used. As previously pointed out, because the pH range is controlled as set forth, the film may be stored for an indefinite amount of time and will not be affected by variations in atmospheric temperature or humidity. This is a very substantial advantage.

A film prepared as above set forth may be utilized in the production of laminated products of various kinds. For the purpose of illustration, its use as a film glue for a three-ply plywood panel is set forth. The fir panel comprises a core member, a face member, and a back member. From the film roll there are cut two sheets of the same area as the plies to be glued, and one of these sheets is laid between the inner surface of the facing material and the opposing core surface, and the other sheet is laid between the inner surface of the backing and the opposing core surface. Thereafter, the assembly is placed in a press which is preferably heated to about 100° C. by steam, hot water, or electrical means, while being subjected to a suitable pressure, as, for example, 150 to 175 pounds per square inch. The press may then be closed and the panel cured for a period of 5 or 6 minutes, which is sufficient to cure a three-ply panel of the size used; namely, one having an initial thickness varying between 0.30 and 0.40 inch. The heat necessary for the above operation may be generated by a machine providing a high frequency electric field.

It is to be noted that using a film glue of the character set forth, it is only necessary to heat the assembled panel to about 100° C. or slightly below, and therefore the physical properties of the wooden members have not been materially affected. More specifically, the moisture content of the wooden members has not been appreciably lowered, and, therefore, after the hot pressing operation, it is not necessary to humidify, as has been customary in the plywood art, employing resin films which cured at temperatures ranging from 135° to 160° C.

It is desired to point out that the dihydroxy benzene aldehyde resins are characterized by a high degree of hygroscopicity and that therefore the film glue produced in accordance with the present invention having a pH as set forth also carries more moisture than an equivalent film impregnated with a monohydroxy benzene aldehyde resin, commonly known as phenolic resins.

It is to be noted that in the process of manufacturing the film of the present invention, the drying is accomplished at a temperature below the boiling point of water and insufficient to cause any premature setting up of any resin solids of the film glue. While to the feel and touch, the film is dry, it does contain sufficient water to plasticize its flow in the hot pressing operation. The carrier film may contain from .5% to 5% of moisture, and preferably .5% to 2%, or .5% to 3%. A film carrier of this character which is impregnated with the dried unset reaction mixture of a setting agent and a permanently fusible dihydroxy benzene aldehyde resin may be interposed between two laminae of wood and the assembly hot pressed. The presence of a moisture content of the order set forth will prevent the absorption or the adsorption by the film carrier of the moisture content or at least some of the moisture content of the wooden members during hot pressing. This avoids any closely predetermined control of the moisture content of the wood prior to hot pressing.

The resin solution herein set forth is exemplary of resin solutions which may be used in the preparation of a film glue, and the invention is not limited to a dihydroxy benzene aldehyde resin prepared in the specific manner set forth. Various other resins may be used, including that set forth in my copending application Serial No. 426,629, now Patent No. 2,385,372, granted September 25, 1945, said resins having their pH values controlled during manufacture within the limits hereinbefore set forth. A brittle solid resin prepared as therein set forth may be dissolved in an equal weight of hot water and the pH adjusted as hereinbefore set forth. Thereafter, a methylene containing hardening agent may be added, as, for example, hexamethylene tetramine, which may be prepared by dissolving hexa in water and adding 10 grams of hexa in solution for every 100 grams of dry resin. This solution may then be introduced into the treating tank of the film glue machine, and the film coated and impregnated by passing through said solution.

It is desired to point out that the concentration of resin treating solution may vary from as low as 10% to as high as 60%, but is more commonly 30% to 45% solid reactive resin, depending upon the operating practice of the individual operator.

While the present invention has been set forth in connection with utilization of resorcin as the dihydroxy benzene, it is within the province of the present invention to use catechol, hydroquinone and substitution products or derivatives thereof. Examples of substituted resorcins may include secondary alkyl resorcins, in which the alkyl member is a lower alkyl or a higher alkyl; resorcin ethers including monomethyl resorcyl ether; resorcin esters including resorcin disulphonic acid esters, and the like. Trihydroxy benzene compounds may also be used in carrying out the present invention. Examples thereof are pyrogallol and phloroglucinol and their derivatives and/or substitution products. Homologs of the dihydroxy and trihydroxy benzenes may also be used.

Instead of using formaldehyde, other aldehydes may be used, such as acetaldehyde, paraldehyde, propionaldehyde, the butyl aldehydes, the furfuralaldehydes, and the like. Instead of using a single aldehyde, it is within the province of the present invention to react the dihydroxy benzene with a mixture of aldehydes such as a mixture of formaldehyde and butyl aldehyde. Dialdehydes may be used in place of the monoaldehydes. As a representative of the dialdehydes, glyoxal is set forth.

It is desired to point out that the resin solutions herein set forth may be produced utilizing alkaline catalysts, acid catalysts, or catalysts may be eliminated from the reaction mixture. However, there are certain advantages connected with the use of catalysts and therefore in the preferred method of producing the condensation products, acid, neutral or alkaline catalysts are used.

In carrying out the present invention, for the dihydroxy benzenes there may be substituted a monohydric benzene or phenol such as phenol per se, cresylic acid, xylenol and the like, in an amount which will not destroy the water solubility of the resulting resin adhesive. Usually the maximum amount of monohydric phenol which may be substituted without destroying the water solubility is in the neighborhood of 25% of the total phenolic body present in the original mix, taken on a molar basis.

The carrier film produced as herein described and impregnated with a dihydroxy benzene aldehyde resin of the character described and having the pH set forth will not be affected by humidity and will be stable at temperatures varying between 40° F. and about 120° or 130° F.

The dihydroxy benzene aldehyde resin adhesives herein disclosed and their equivalents, produced in accordance with the general disclosures of the present application, may be used in the production of airplane structures, boats, furniture, light structural sections such as beams and arches. The invention is of particular value in the production of laminated wood, plywood or wherever it is desirable to bond plies of cellulosic material to each other or to provide a laminated or panel structure which may comprise a layer of wood together with a layer of cotton fibers, cloth or asbestos. The plies which are bonded with the adhesives of the present invention may be inorganic in character, as, for example, asbestos, glass fibers, and the like.

In the production of airplane structures and boat structures, instead of the alternate plies or layers being of wood, there may be a layer of wood, then a layer of cotton fibers or cloth or asbestos, and then a layer of wood and another layer of cotton fibers or cloth or asbestos. In other words, it is not necessary that both plies be of wood. Only one ply need be of wood and in some cases, the invention may be carried out by using plies of cloth, cotton or other textile material or plies of inorganic material which may be mineral in character, typified by asbestos. Any of these materials or equivalent materials may be used, the only limitation being that the material must not be damaged at the temperature of curing which is in the neighborhood of 200° to 220° F.

In the production of large structural articles, such as large sections of airplanes, large objects of furniture, and sections of boats, such as the hull of a dinghy, the lamination of the formed article by the conventional methods of pressing is difficult due to the size of the articles being formed. In such cases, it is necessary to wrap the object around the form or use the technique of bag molding in an autoclave. In cases such as this, it has been found that the herein disclosed resins are particularly advantageous because the heat penetration of such large objects is much more difficult than standard panels and the low temperature curing of these resins lowers the time cycle and the temperature necessary to produce the proper bonding.

Employing bag molding, the laminae with the adhesive applied are placed in position either inside or outside of a hard mold. Pressure is then applied by means of a rubber bag which is wrapped around the piece or inserted in the core of the piece and pumped up with air to the desired pressure. Pressures in this case generally range from 50 to 60 pounds per square inch. In many cases, the whole assembly is slid into an autoclave and baked at a temperature sufficient to cure the resin, which, in this case, utilizing the herein disclosed resins, may be as low as 200° to 220° F. As a variation of the procedure above set forth, the laminae may be clamped into position with spring clamps and the whole structure placed in an autoclave and cured therein at a temperature as low as 200° to 220° F.

Utilizing bag molding, pressure may be applied by using a paper or Cellophane bag. To generate the desirable pressure, hot water or steam may also be used.

It is desired to point out that by using the herein disclosed adhesive agents that the life of the bags employed in the bag molding process is considerably extended because of the lower temperatures necessary for curing. Thus rubber bags which are now useful for 200 applications with adhesives curing at 270–300° F. may be used 600 or 800 times at the lower temperatures of 200–220° F. employed with the herein disclosed bonding mediums.

Having thus described the invention, what is claimed as new and desired to be secured by Letters Patent is:

1. A heat-reactive adhesive bonding medium for hot pressing work comprising an impregnated film carrier containing the substantially dry unset resin compound formed from a solution of a dihydroxy benzene-aldehyde condensation product in which the molecular proportion of the dihydroxy benzene to the aldehyde is less than one of the latter to one of the former, and hexamethylenetetramine in a quantity sufficient to set and harden said resin, said resin compound when dissolved in water having a pH varying from 7 to 9, said resin impregnated film being substantially unaffected by variations in atmospheric humidity and having sufficient moisture to cause the resin-content of the film to flow during hot pressing.

2. The method of bonding a plurality of plywood members comprising impregnating a porous film carrier with an unset aqueous solution of hexamethylenetetramine and a resinous material, the essential resin component thereof being a resinous dihydroxy benzene-aldehyde condensation product formed from a mixture of a dihydroxy benzene and an aldehyde, in which the molecular proportion of the dihydroxy benzene to the aldehyde is less than 1 of the latter to 1 of the former, the hexamethylenetetramine being present in a quantity sufficient to set and harden the resinous condensation product during hot pressing, said aqueous solution having a pH varying between 7 and 9, drying the impregnated film carrier at a temperature inhibiting setting of the impregnated resinous condensation product while leaving enough moisture in the film carrier to plasticize the film-contents during hot pressing, interposing said film carrier between plywood members to be bonded, and heat-treating the resulting assembly under pressure and at a temperature of at least 200° F.

3. The method of bonding a plurality of fibrous members together comprising impregnating a porous film carrier with an unset aqueous solution of hexamethylenetetramine and a resinous material, the essential resin component thereof being a resinous dihydroxy-benzene aldehyde condensation product formed from a mixture of a dihydroxy-benzene and an aldehyde, in which the molecular proportion of the dihydroxy-benzene to the aldehyde is less than 1 of the latter to 1 of the former, the hexamethylenetetramine being present in a quantity sufficient to set and harden the resinous condensation product during hot pressing, said aqueous solution having a pH varying between 7 and 9, drying the impregnated film carrier at a temperature inhibiting setting of the impregnated resinous condensation product while leaving enough moisture in the film carrier to plasticize the film-contents during hot pressing, interposing said film carrier between the fibrous members to be bonded, and heat-treating the resulting assembly under pressure and at a temperature of at least 200° F.

4. The method of claim 3 in which the dihydroxy-benzene is resorcin and the aldehyde is formaldehyde.

5. The method of bonding a plurality of plywood members comprising impregnating a porous film carrier with an unset aqueous solution of hexamethylenetetramine and a resinous material, the essential resin component thereof being a resinous dihydroxy benzene-aldehyde condensation product formed from a mixture of a dihydroxy benzene and an aldehyde, in which the molecular proportion of the dihydroxy benzene to the aldehyde is less than 1 of the latter to 1 of the former, the hexamethylenetetramine being present in a quantity sufficient to set and harden the resinous condensation product during hot pressing, said aqueous solution having a pH varying between 7 and 9, drying the impregnated film carrier at a temperature inhibiting setting of the impregnated resinous condensation product while leaving enough moisture in the film carrier to plasticize the film-contents during hot pressing, interposing said film carrier between the plywood members to be bonded and heat curing the resulting assembly under pressure at a temperature varying from about 200° F. to about 220° F. to inhibit substantially lowering of the moisture content of the plywood members whereby rehumidification of the plywood assembly is avoided.

6. The method of bonding a plurality of fibrous members together comprising impregnating a porous film carrier with an unset aqueous solution of hexamethylenetetramine and a resinous material, the essential resin component thereof being a resinous dihydroxy benzene-aldehyde condensation product formed from a mixture of a dihydroxy benzene and an aldehyde, in which the molecular proportion of the dihydroxy benzene to the aldehyde is less than 1 of the latter to 1 of the former, the hexamethylenetetramine being present in a quantity sufficient to set and harden the resinous condensation product during hot pressing, said aqueous solution having a pH varying between 7 and 9, drying the impregnated film carrier at a temperature inhibiting setting of the impregnated resinous condensation product while leaving enough moisture in the film carrier to plasticize the film-contents during hot pressing, interposing said film carrier between the fibrous members to be bonded and heat curing the resulting assembly under pressure at a temperature varying from about 200° F. to about 220° F. to inhibit substantially lowering of the moisture-content of the fibrous members.

7. The method of claim 5 in which the dihydroxy benzene is resorcin and the aldehyde is formaldehyde.

8. The method of claim 6 wherein the dihydroxy benzene is resorcin and the aldehyde is formaldehyde.

9. The method of bonding a plurality of wooden members comprising impregnating a porous film carrier with an unset aqueous solution of hexamethylenetetramine and an aqueous solution of a resinous material, the essential resin component thereof being a resinous resorcin-aldehyde condensation product formed from a mixture of a resorcin and an aldehyde, in which the molecular proportion of the resorcin to the aldehyde is less than 1 of the latter to 1 of the former, the hexamethylenetetramine being present in a quantity sufficient to set and harden the resinous condensation product during hot pressing, said aqueous solution having a pH varying between 7 and 9, drying the impregnated film carrier at a temperature inhibiting setting of the impregnated resinous condensation product while leaving enough moisture in the film carrier to plasticize the film-contents during hot pressing, interposing said film carrier between the wooden members to be bonded and subjecting the resulting assembly to heat and pressure.

10. The method of preparing a heat-reactive adhesive carrier film comprising impregnating a porous film carrier with an unset aqueous solution of hexamethylenetetramine and a resinous material, the essential resin component thereof being a resinous dihydroxy benzene-aldehyde condensation product formed from a mixture of a dihydroxy benzene and an aldehyde in which the molecular proportion of the dihydroxy benzene to the aldehyde is less than 1 of the latter to 1 of the former, the hexamethylenetetramine being present in a quantity sufficient to set and harden said resinous condensation product during hot pressing, said aqueous solution having a pH varying between 7 and 9, and drying the impregnated film carrier at a temperature inhibiting setting of the impregnated resinous condensation product while leaving enough moisture in the carrier film to cause the resin-content of the film to flow during hot pressing.

11. The method of preparing a heat-reactive adhesive carrier film comprising impregnating a porous film carrier with an unset aqueous solution of hexamethylenetetramine and a resinous material, the essential resin component thereof being a resinous dihydroxy benzene-aldehyde condensation product formed from a mixture of a dihydroxy benzene and an aldehyde in which the molecular proportion of the dihydroxy benzene to the aldehyde is less than 1 of the latter to 1 of the former, the hexamethylenetetramine being present in a quantity sufficient to set and harden said resinous condensation product during hot pressing, said aqueous solution having a pH varying between 7.3 and 8, and drying the impregnated film carrier at a temperature inhibiting setting of the impregnated resinous condensation product while leaving enough moisture in the carrier film to cause the resin-content of the film to flow during hot pressing.

12. The method of claim 10 in which the dihydroxy benzene is resorcin.

13. The method of claim 10 in which the dihydroxy benzene is resorcin and the aldehyde is formaldehyde.

14. The method of claim 11 in which the dihydroxy benzene is resorcin and the aldehyde is formaldehyde.

15. A heat-reactive adhesive carrier film for hot pressing work comprising an impregnated film carrier containing the substantially dry unset mixture of hexamethylenetetramine and a permanently fusible dihydroxy benzene-aldehyde resin, said mixture when dissolved in water forming a resin solution having a pH varying from 7 to 9, said resin-impregnated film being substantially unaffected by variations in atmospheric humidity and having sufficient moisture to cause the resin-content of the film to flow during hot pressing.

16. A heat-reactive adhesive carrier film for hot pressing work comprising an impregnated film carrier containing the substantially dry unset mixture of hexamethylenetetramine and a permanently fusible resorcin-aldehyde resin, said mixture when dissolved in water forming a resin solution having a pH varying from 7 to 9, said resin-impregnated film being substantially unaffected by variations in atmospheric humidity and having sufficient moisture to cause the resin-content of the film to flow during hot pressing.

17. A heat-reactive adhesive carrier film for hot pressing work comprising an impregnated film carrier containing the substantially dry unset mixture of hexamethylenetetramine and a permanently fusible resorcin-formaldehyde resin, said mixture when dissolved in water forming a resin solution having a pH varying from 7 to 9, said resin-impregnated film being substantially unaffected by variations in atmospheric humidity and having sufficient moisture to cause the resin-content of the film to flow during hot pressing.

PHILIP HAMILTON RHODES.

REFERENCES CITED

The following references are of record in the file of this patent:

UNITED STATES PATENTS

| Number | Name | Date |
| --- | --- | --- |
| 2,128,229 | Charch | Aug. 30, 1938 |
| 2,150,698 | Nevin | Mar. 14, 1939 |
| 1,960,177 | Weber et al. | May 22, 1934 |
| 2,276,004 | Vidal et al. | Mar. 10, 1942 |
| 1,065,495 | Aylesworth | June 24, 1913 |
| 1,849,109 | Novotny | Mar. 15, 1932 |
| 942,700 | Baekeland | Dec. 7, 1909 |
| 949,671 | Baekeland | Feb. 15, 1910 |
| 1,020,594 | Aylsworth | Mar. 19, 1912 |
| 2,089,034 | Nevin | Aug. 3, 1937 |